United States Patent [19]

Yamamura

[11] 4,312,628
[45] Jan. 26, 1982

[54] TURBOMOLECULAR VACUUM PUMP HAVING VIRTUALLY ZERO POWER MAGNETIC BEARING ASSEMBLY WITH SINGLE AXIS SERVO CONTROL

[75] Inventor: Akira Yamamura, Framingham, Mass.

[73] Assignee: Cambridge Thermionic Corporation, Cambridge, Mass.

[21] Appl. No.: 40,893

[22] Filed: May 21, 1979

[51] Int. Cl.³ .................. F04B 35/04; F16C 35/00
[52] U.S. Cl. ................................ 417/424; 308/10
[58] Field of Search ............. 417/424, 410, 354, 353, 417/359, 420; 308/10

[56] References Cited

U.S. PATENT DOCUMENTS

| | | | |
|---|---|---|---|
| 3,428,371 | 2/1969 | Lyman | 308/10 |
| 3,473,852 | 10/1969 | Lyman | 308/10 |
| 3,731,984 | 5/1973 | Habermann | 308/10 |
| 3,860,300 | 1/1975 | Lyman | 308/10 |
| 4,023,920 | 5/1977 | Buchler | 417/424 |

OTHER PUBLICATIONS

*Vacuum Technology,* "Research/Development", Mar. 1977, vol. 28, No. 3, p. 57ff.
"*TurboVac 550M*", Leybold-Heraeus Sales Literature.

Primary Examiner—Billy S. Taylor
Attorney, Agent, or Firm—David S. Woronoff

[57] ABSTRACT

A turbomolecular vacuum pump utilizes a virtually zero power magnetic bearing assembly with a single axis sevo control and has an optimized L/D ratio and an optimized number of pole faces. In such a structure, radial stiffness is low and radial damping is high so that single axis control is possible. A frusto-conical mechanical bearing structure is shown as a fail-safe back-up for the magnetic suspension system taught.

4 Claims, 2 Drawing Figures

TYPICAL VZP BLOCK DIAGRAM

TURBOMOLECULAR VACUUM PUMP HAVING VIRTUALLY ZERO POWER MAGNETIC BEARING ASSEMBLY WITH SINGLE AXIS SERVO CONTROL

SUMMARY OF THE INVENTION

The present invention relates to a novel turbo pump having a single axis magnetic suspension system employing both permanent and electromagnets. A VZP sensing and control system is utilized to minimize steady state power consumption and thereby virtually eliminate cooling and outgassing problems. The rotor is driven by a brushless D.C. motor or a hysterisis motor.

A number of mechanical bearing structures are provided to protect the pump in the event of failure of the magnetic suspension system and to give such incidental radial bearing support as may be required. One of the mechanical bearing structures disclosed is a pair of mating frusto-conical surfaces formed on the rotor and the vertical stator shaft. In the event of a failure of the magnetic suspension system the rotor would be supported in both radial and axial directions by the mating frustro-conical surfaces.

The permanent magnets most likely will be formed from rare earth materials such as samarium cobalt. The electromagnets may be sealed in their respective wells by fiberglass or other suitable material.

BRIEF DESCRIPTION OF THE DRAWING

FIG. 1 shows one embodiment of the present invention in section.

FIG. 2 shows a block diagram of a control system forming a part of the present invention.

DESCRIPTION OF THE PREFERRED EMBODIMENT

FIG. 1 shows a turbomolecular pump 10 having a pump rotor 17 and a normally vertically oriented stator shaft 18. A motor 70, preferably either a brushless D.C. motor or a hysterisis motor, drives the rotor at at least 30,000 R.P.M. Attached to the rotor are a number of turbine blades 50. Attached to the stator are a number of blades 52. Each of these blades operate in the conventional manner of turbo pump blades.

In normal operation the rotor 17 is suspended about the stator 18 by a magnetic bearing assembly 15, 115. Upper and lower coils 14,114, are wound in slots or wells 16,116 formed in a soft iron core. The coils when energized by a power source not shown become electromagnets. Permanent magnets 24,124 are also fitted into slots formed in the soft iron. The permanent magnets 24,124 may be formed of rare earth materials such as samarium cobalt.

Virtually Zero Power magnetic suspension is explained in detail in U.S. Pat. No. 3,860,300 which is incorporated herein by reference. In essence that patent describes an electronic sensor and control system in which either or both change of position and rate of change of position are sensed.

U.S. Pat. No. 3,860,300 shows the essentials of its inventive contribution in FIG. 1. FIG. 1 of that patent shows electromagnets 12 and 13 powered by a differential amplifier 29. A rigid body 11 is supported in part by permanent magnets 14,15,26 and 27. However, the permanent magnet suspension is unstable in an axial direction. The stability is provided by the electromagnets 12 and 13.

The electromagnets 12 and 13 are controlled by signals generated by a rate coil 32 which uses a light source 34 and a photocell 36—36 through the operation of the differential amplifier 29. This combination of structure functions as a control apparatus.

In operation, signals from the position sensors 36—36 and from the rate coil 32 are fed to the amplifier 29 for controlling the position of the suspended body 11. The rate coil 32 senses the rate or change of positions of the body 11 otherwise known as its velocity. This operation of the Virtually Zero Powered Magnetic Suspension is described in considerable detail in that patent in Column 3, line 38 through Column 4 to Column 5, line 5.

Turning now to FIG. 1, position sensor 28 which is an eddy current sensor has its signal fed to the power stage as shown in FIG. 2. Similarly, rate coil 30 has its signal fed to the power stage as shown in the diagram in FIG. 2. These two signals act as described in U.S. Pat. No. 3,860,300. These signals are fed to a differential amplifier which provides a different amount of output power to the upper and lower coils 14,114, for maintaining the suspended body in a position between the pole faces in which no steady state power is required to keep the body in suspension in the presence of a continuing disturbing force. A position sensor 28 is shown attached to the shaft 18. Sensor 28 may be either an eddy current sensor or a capacitive sensor. A polished target 32 can be fixed to the rotor to improve the accuracy of the sensor and to reduce the noise produced. A rate coil 30 is shown fixed to the stator 18. The flux of permanent magnet 24 is sensed by coil 30 and thereby produces the rate information for use by the servo amplifier not shown.

Virtually all magnetic flux generated by the permanent magnets and the electromagnets passes through the pole faces 40,42,44,46 in the upper magnetic assembly and through pole faces 140,142,144,146 in the lower magnetic assembly.

In the embodiment shown the rotor is outside the stator. The rotor has radially inwardly extending arms 82, 182, formed or attached thereto. The pole faces 42,46,142,146, extend from the arms 82,182. Angled ramp surfaces 60,160 are formed on arms 82,182, to engage mating surfaces 62,162, formed on the stator 18. Mating surfaces 62,162, are formed as part of the stainless steel bearing structure for providing occasional radial support for the rotor through stainless steel or polyamide bearings 72,172 and stainless steel or polyamide bearing sleeves 76 176. Bearing sleeves 76,176, have normally horizontally extending surfaces 78,178, for providing some vertical support for the rotor in the event of a failure in the magnetic suspension system.

The mutually engaging bearing surfaces 60,62 and 160,162 are formed in a frustro-conical shape. In the event the magnetic suspension system fails the ramped structure will operate to maintain the rotor properly centered with respect to the stator thereby protecting the rotor from damage.

Since the present invention uses permanent magnets and VZP control the addition of a small energy source such as a battery will serve to keep the rotor spinning in proper control for a substantial period of time thus eliminating a source of failure of the magnetic bearings which can cause a system shutdown, if power fails.

The ratio of the length of the rotor to its diameter should be:

$$D = L\sqrt{\frac{\pi K_r}{12K_x}};$$

where $K_r$ and $K_x$ are the radial and axial stiffness respectively. Once L is chosen the best diameter D for torsional stiffness of the magnetic suspension is given by the above relationship.

The recognition that a single axis magnetic suspension combined with an optimum L to D relationship and the use of the VZP concept in a turbo pump are each individually and collectively believed to be a significant contribution to the turbo pump art. The gain in simplicity; the reduction in heat produced and outgassing generated offer tremendous advantages to the users of turbo pumps.

Modification of the preferred embodiment may be made without departing from the scope and spirit of the present invention.

Figure 1:
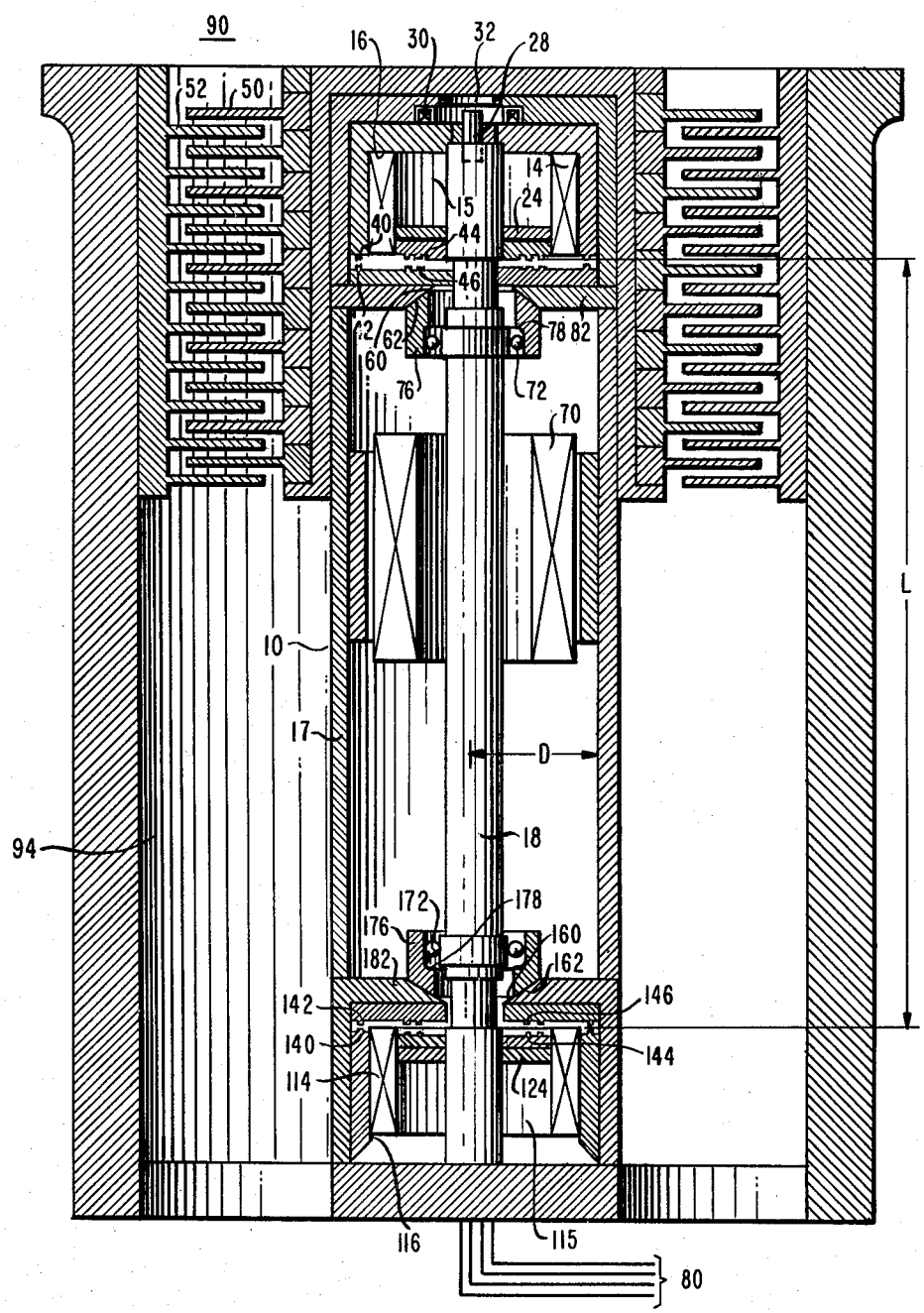
Figure 2:
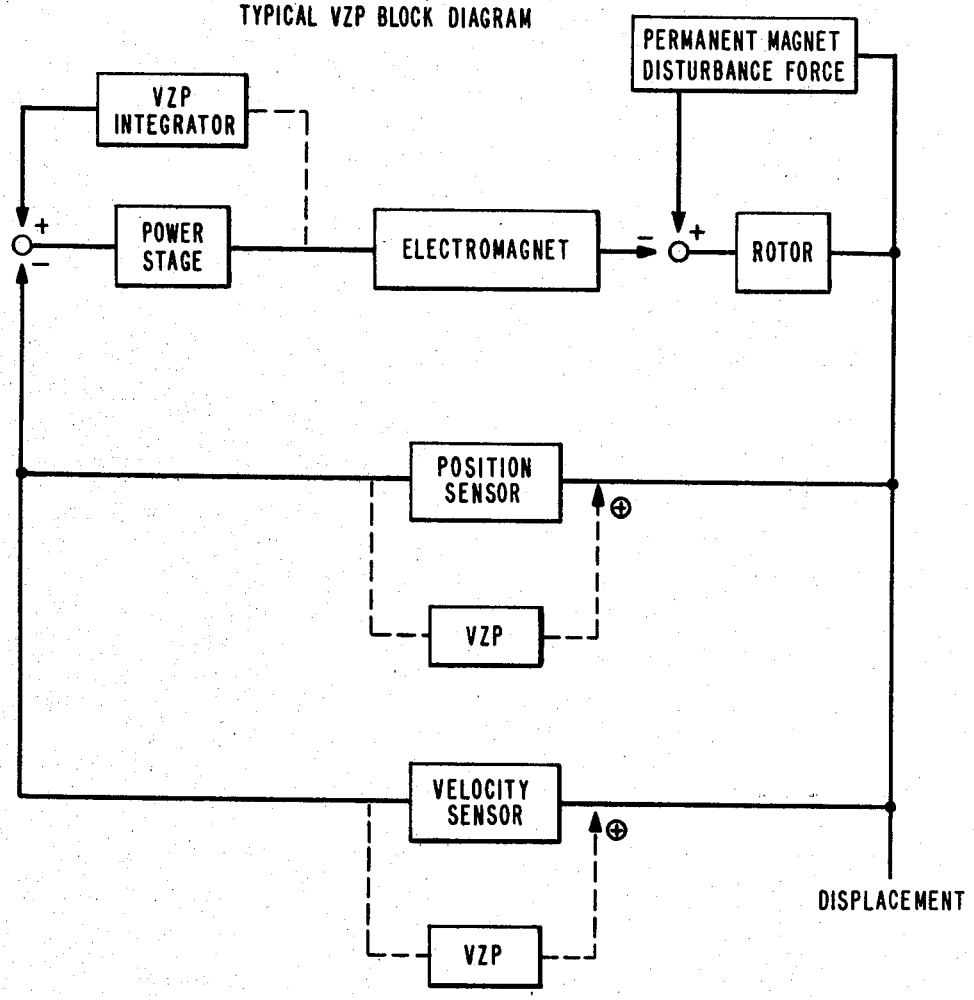

As shown in FIG. 1 inner pole faces 44,46,144,146 have two pole faces. Outer pole faces 40,42,140,142 are unitary pole faces. The area of pole face 40 substantially equals the area of the two pole faces 44. The same relationship exists between pole face 140 and pole faces 144. Similarly the area of pole face 40 is substantially equal to that of pole face 42. The area of pole faces 44 substantially equals the area of pole faces 46. In operation the flux density within the pole faces (fringing rings) approaches the saturation point of soft iron. However the flux density within the other portions of the soft iron is kept comfortably below saturation levels.

As shown in FIG. 1, the soft iron portions of the structure are kept on the external side (outer circumference) of the rotor and stator to make the structure easier to machine. Such a construction serves to reduce manufacturing costs.

A significant feature of the invention which could be easily overlooked is that radial stiffness is low and radial damping is high. Shaft resonance is kept above design speed. The conical mechanical bearings contribute to stability in the event of a magnetic bearing failure or a power failure.

The L/D ratio should be in the range of 2.5 to 3.5. L is the axial distance between pole faces and D is the outer diameter of the pole faces. If the ratio is less than 2.5, static instability is a problem; if the ratio is more than 3.5 dynamic instability results. If this ratio is satisfied for the outer pole faces then the inner pole faces will be stable.

It has also been found that the ratio of radial stiffness to axial stiffness should be about 1 to 7 for stability in a single axis control system.

What is claimed is:

1. In a turbomolecular vacuum pump including a pump housing; a vertically oriented hollow pump rotor disposed within the housing; a vertically oriented shaft affixed to the pump housing and extending inside of the pump rotor; the combination comprising:
   first and second permanent magnet means affixed to the vertically oriented shaft;
   first and second electromagnet means affixed to the vertically oriented shaft;
   means for sensing the change in position of the pump rotor relative to the vertically oriented shaft;
   means for controlling the position of the pump rotor relative to the vertically oriented shaft such that a new neutral force position is obtained in the presence of persistent disturbing forces;
   the control means is driven by the signals produced by the sensing means;
   said first and second electromagnet means are controlled by said control means;
   the pump rotor has first and second ends;
   the vertically oriented shaft has first and second ends;
   the electromagnet means and the permanent magnet means are disposed on the vertically oriented shaft means near the ends thereof such that pole faces are formed between the respective first and second ends of the pump rotor and the vertically oriented shaft;
   velocity sensing means is mounted on said vertically oriented shaft for sensing the rate of change of position of the pump rotor;
   said velocity sensing means generates a signal which is fed to said control means; an electric drive means for turning said rotor in which said drive means comprises a brushless D.C. motor;
   said pump rotor and said vertically oriented shaft have first and second mating frustro-conical shaped bearing surfaces for supporting the pump rotor in the event of a failure of the magnetic suspension.

2. The turbomolecular pump claimed in claim 1 including further a small source of stored electrical energy for keeping the magnetic suspension in operation during a power failure.

3. The turbomolecular pump claimed in claim 1 wherein said first and second ball bearing assembly members have horizontal support surfaces for supporting a portion of the load transferred to the frustro-conical shaped bearing surfaces.

4. In a turbomolecular vacuum pump including a pump housing; a vertically oriented hollow pump rotor disposed within the housing; a vertically oriented shaft affixed to the pump housing and extending inside of the pump rotor; the combination comprising:
   first and second permanent magnet means affixed to the vertically oriented shaft;
   first and second electromagnet means affixed to the vertically oriented shaft;
   means for sensing the change in position of the pump rotor relative to the vertically oriented shaft;
   means for controlling the position of the pump rotor relative to the vertically oriented shaft such that a new neutral force position is obtained in the presence of persistent disturbing forces;
   the control means is driven by the signals produced by the sensing means;
   said first and second electromagnet means are controlled by said control means independently of each other; and,
   the rotor has a radial stiffness of $K_r$ and an axial stiffness of $K_x$ and a length L and a diameter D and the relationship between D and L is:

$$D \cong L\sqrt{\frac{\pi K_r}{12K_x}}.$$

* * * * *